(12) United States Patent
Backes

(10) Patent No.: US 7,505,434 B1
(45) Date of Patent: Mar. 17, 2009

(54) VLAN TAGGING IN WLANS

(75) Inventor: Floyd J. Backes, Sharon, NH (US)

(73) Assignee: Autocell Laboratories, Inc., Acton, MA (US)

( * ) Notice: Subject to any disclaimer, the term of this patent is extended or adjusted under 35 U.S.C. 154(b) by 429 days.

(21) Appl. No.: 11/159,955

(22) Filed: Jun. 23, 2005

(51) Int. Cl.
*H04W 4/00* (2006.01)

(52) U.S. Cl. ................... 370/331; 455/432.1

(58) Field of Classification Search .......... 370/331, 370/401, 338, 463, 412, 466, 474, 201; 455/432.1, 455/436, 442
See application file for complete search history.

(56) References Cited

U.S. PATENT DOCUMENTS

| | | | |
|---|---|---|---|
| 6,795,407 B2 | 9/2004 | Chesson | |
| 6,870,815 B2 | 3/2005 | McFarland et al. | |
| 2005/0163078 A1* | 7/2005 | Oba et al. | 370/331 |
| 2005/0180429 A1* | 8/2005 | Ghahremani et al. | 370/395.21 |
| 2005/0265397 A1* | 12/2005 | Chapman et al. | 370/490 |
| 2006/0165103 A1* | 7/2006 | Trudeau et al. | 370/401 |

* cited by examiner

*Primary Examiner*—Melody Mehrpour
(74) *Attorney, Agent, or Firm*—Anderson Gorecki & Manaras LLP

(57) ABSTRACT

A wireless access point is operable to tag packets received from mobile clients. For example, a VLAN tag or Layer-3 tunnel tag for a packet is determined based at least in-part on a mapping between a mobile client and tag maintained by the access point. In one embodiment the access point uses Association IDs ("AIDs") to uniquely identify mobile clients in the BSS. Hence, the mapping is between A/Ds and VLAN tags/Layer-3 tunnel tags. The mapping may be generated by snooping authentication related communications or from information maintained by a switch, such as a MAC address to tag mapping.

14 Claims, 2 Drawing Sheets

VLAN TAGGING IN WLANS

FIELD OF THE INVENTION

This invention relates generally to the field of mobility, and more particularly to appending tags in WLANs to facilitate mobility.

BACKGROUND OF THE INVENTION

Wireless Local Area Networks ("WLANs") generally include a plurality of access points in communication with a switch for providing wireless access to mobile client devices. Currently, WLANs are most often used to provide access to mobile devices such as laptop computers. Since most users do not walk around while using a laptop computer, no great need was felt for high-performance mobility to support roaming between access points. However, with the current trend toward developing WLANs that support mobile phones a need has arisen for improved mobility. Further, the security protocols and QoS controls that were generally acceptable for data communications are problematic for support of voice communications on WLANs It is generally known in the art that Virtual Local Area Networks ("VLANs") such as specified by the IEEE 802.1Q standard can be used to facilitate mobility, including support for voice communications over WLANs. VLANs differentiate traffic by pre-pending packets originating from devices in a particular VLAN with a tag that is indicative of the VLAN. In terms of support for voice traffic, voice clients can be differentiated from data clients by assigning voice clients to one or more distinct VLANs. Further, priority may be give to the VLAN that supports voice traffic, thereby providing some level of QoS control. Still further, traffic on the voice VLAN may all be directed through a particular gateway or other network device, thereby providing a level of security.

Typically, the VLAN tag for a particular packet is determined at a switch or server. In particular, the switch or server examines the packet and uses fields such as the source and destination MAC address to index into a table that yields the appropriate VLAN for the packet. However, determining which VLAN is associated with a packet can be computationally costly because the MAC address fields are relatively long, resulting in a large table. This can be problematic as the number of supported wireless clients increases.

SUMMARY OF THE INVENTION

In accordance with the invention, a VLAN tag for a data unit is determined based at least in-part on a mapping between an access point and a mobile client. In one embodiment a wireless access point that supports communication by an associated mobile client via a communications path authenticated by an authentication device includes: processing logic operable to create a mapping between: a client identifier that uniquely identifies the associated mobile client relative to the access point, and an identifier indicative of the authenticated communications path; and processing logic operable to modify a data unit received from the mobile client by identifying the authenticated communications path from the client identifier and adding the authenticated communications path identifier to the data unit before transmitting the modified data unit from the access point. The client identifier may be an Association ID ("AID"), and the authenticated communications path identifier may be a Virtual Local Area Network ("VLAN") tag or a Layer-3 tunnel tag.

A method in accordance with the invention executed by an access point for supporting communication by an associated mobile client via a communications path authenticated by an authentication device, includes the steps of creating a mapping between: a client identifier that uniquely identifies the associated mobile client relative to the access point, and an identifier indicative of the authenticated communications path; and modifying a data unit received from the mobile client by: identifying the authenticated communications path from the client identifier, and adding the authenticated communications path identifier to the data unit before transmitting the modified data unit from the access point.

One advantage of the invention is improved performance. As already discussed, using a mapping between MAC addresses and VLAN tags is computationally costly because the MAC address fields are relatively large and the table of MAC addresses is relatively large. In contrast, the number of wireless clients associated with an access point is relatively small so the identifier, e.g., AID, used by the access point to map between associated clients and VLAN tags is relatively small and easy to search.

DETAILED DESCRIPTION

Figure 1:
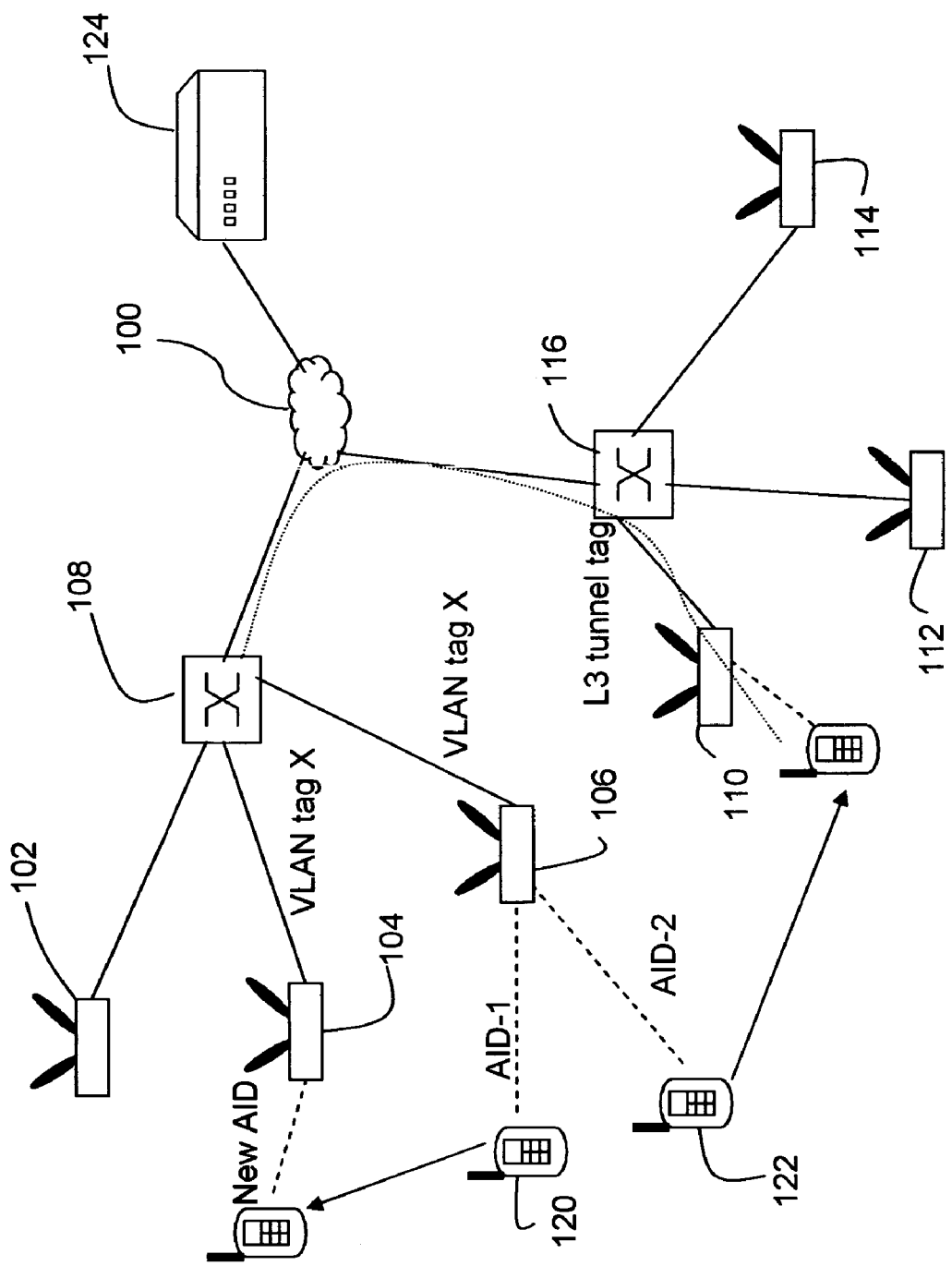
FIG. 1 is a network diagram illustrating VLAN tagging by access points.

FIG. 1 illustrates a wireless network including two WLAN subnets which are interconnected via a network cloud (100). A first subnet includes access points (102, 104, 106) in communication with a switch (108). A second subnet includes access points (110, 112, 114) in communication with a switch (116). The access points are operable to provide communications access to wireless mobile devices (120, 122) such as phones, PDAs laptop computers, and other devices. A Remote Authentication Dial-In User Service ("RADIUS") server (124) is operable to communicate with mobile devices via the subnets.

Before a mobile device is permitted to establish communications via a VLAN, that mobile device must be authenticated. The RADIUS server (124) is operable to provide authentication services. In particular, the RADIUS server is preconfigured with data indicating which users or devices are permitted to join particular VLANs. The authentication itself may be based on password, magnetic card swipe or simply the MAC address of a particular device. Each switch (108, 116) is operable to snoop authentication-related communications between the mobile device (120) and the RADIUS server (124) in order to build an authentication mapping. In particular, the switch (108) builds a mapping between MAC addresses and VLAN tags.

Each access point is capable of supporting multiple mobile devices. In order to coordinate the supported mobile devices, the access points transmit beacons at a rate of about 5 to 20 times per second. The beacons indicate the SSID of the WLAN, time, capabilities, supported rates, and PHY parameter sets. The PHY parameter sets include an indication of the order in which mobile devices associated with the access point transmit between beacons. In particular, the frame format used for communications between mobile devices and access points includes a 2-bit D/ID field that includes an Association ID ("AID") that is unique for each mobile device in the Basic Service Set ("BSS"). The AID is included in packets transmitted by the mobile devices so that when a packet is received by the access point from an associated mobile device, the AID uniquely identifies that packet as having been sent by that particular mobile device.

Figure 2:
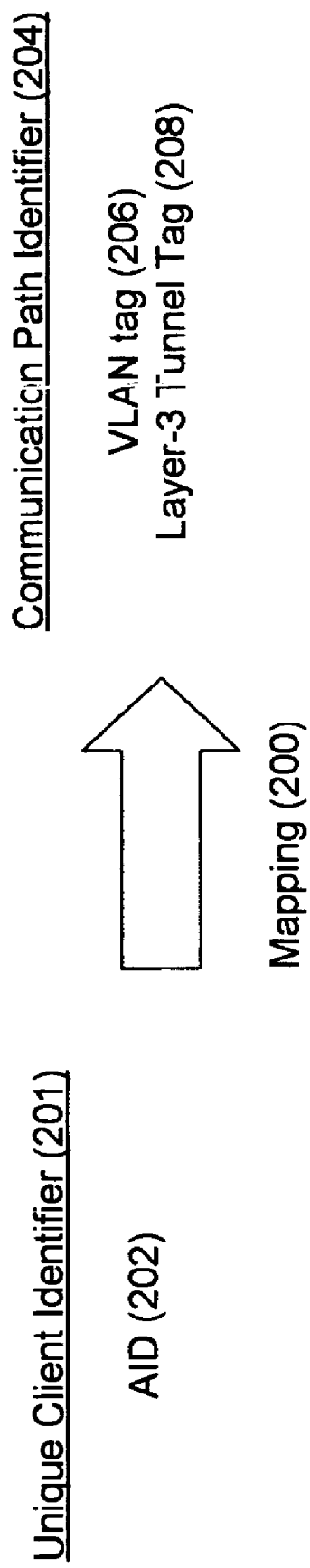
FIG. 2 illustrates a mapping employed by the access points to tag packets received from the mobile devices.

Referring now to FIGS. 1 and 2, the access points (102, 104, 106, 110, 112, 114) of the present invention are operable to implement VLAN tagging based on AIDs. Each access point generates a mapping (200) for mobile devices in its BSS. For example, the mapping may be between client identifiers (201), e.g., AIDs (202), and communication path identifiers (204), e.g., VLAN tags (206). When a packet is received by an access point from a mobile device the access point employs the AID to index into the AID to VLAN tag mapping in order to identify the VLAN tag of the VLAN to which the mobile device is joined. The VLAN tag returned from the mapping is then pre-pended to the packet received from the mobile device, and the resulting packet is transmitted to the switch.

The AID to VLAN tag mapping may be populated by identifying the VLAN to which a mobile device is assigned when that mobile device authenticates with the RADIUS server. For example, the VLAN tag for a newly associated mobile device may be determined at the access point by snooping communications between the mobile device and the RADIUS server during authentication. Alternatively, the access point may obtain information needed to produce the AID to VLAN tag mapping from the switch, e.g., by using the MAC address to VLAN tag mapping maintained by the switch. Similarly, the access point may obtain the appropriate VLAN tag from the switch when a packet is received from a mobile device for which no entry exists in the AID to VLAN tag mapping. Regardless of the technique employed to populate the AID to VLAN tag mapping, subsequent communications from that mobile device to the access point can be pre-pended with the appropriate VLAN tag simply by employing the mapping, and without resorting to the more time consuming and computationally costly resolution based on MAC addresses.

When a handoff occurs within a subnet the mobile device is re-authenticated. Depending on the technique employed, the re-authentication may involve communication with the RADIUS server or with some intermediate device which caches some of the authentication information. Regardless of the technique employed, the access point with which the mobile client is becoming associated creates a mapping for the mobile device in the AID to VLAN tag mapping. This may be accomplished by snooping authentication related communications, as already described above, or by obtaining the information from the switch. Hence, although the mobile device may be assigned a new AID, the new access point will prepend packets from the mobile device with the same VLAN tag as was done by the previous access point.

When the handoff occurs across subnets a modified entry may be required in the mapping. For example, if the access point with which the mobile device is becoming associated is part of a subnet that does not support the VLAN then communication may be maintained by creating a Layer-3 tunnel from the non-supporting subnet to the supporting subnet. In this case the access point creates a mapping entry of AID to Layer-3 tunnel tag (208). Hence, when subsequent packets are received from the mobile device the access point prepends the packets with the Layer-3 tunnel tag and transmits the packets to the switch, which subsequently forwards the packets to the original switch via the network. The original switch is operable to strip the Layer-3 tunnel tag and prepend the packet with the appropriate VLAN tag.

It should be noted that the invention is not limited to the particular mappings described above. For example, any client identifier which uniquely identifies the mobile device within the BSS could be employed on one side of the mapping, and any communication pathway identifier could be employed on the other side of the mapping.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A wireless access point that supports communication by an associated mobile client via a communications path authenticated by an authentication device, comprising:
   processing logic operable to create a mapping between:
      a client identifier that uniquely identifies the associated mobile client relative to the access point, and
      an identifier indicative of the authenticated communications path; and
   processing logic operable to modify a data unit received from the mobile client by identifying the authenticated communications path from the client identifier and adding the authenticated communications path identifier to the data unit before transmitting the modified data unit from the access point.

2. The access point of claim 1 wherein the client identifier includes an Association ID ("AID").

3. The access point of claim 2 wherein the authenticated communications path identifier includes a Virtual Local Area Network ("VLAN") tag.

4. The access point of claim 2 wherein the authenticated communications path identifier includes a Layer-3 tunnel tag.

5. The access point of claim 1 wherein the mapping is created by snooping authentication-related communication between the mobile client and a RADIUS server.

6. The access point of claim 1 wherein the mapping is created by snooping authentication-related communication between the mobile client and a switch in the same subnet as the access point.

7. The access point of claim 1 wherein the mapping is obtained directly from a switch in the same subnet as the access point.

8. A method executed by an access point for supporting communication by an associated mobile client via a communications path authenticated by an authentication device, comprising the steps of:
   creating a mapping between:
      a client identifier that uniquely identifies the associated mobile client relative to the access point, and
      an identifier indicative of the authenticated communications path; and
   modifying a data unit received from the mobile client by:
      identifying the authenticated communications path from the client identifier, and
      adding the authenticated communications path identifier to the data unit before transmitting the modified data unit from the access point.

9. The method of claim 8 wherein the client identifier includes an Association ID ("AID").

10. The method of claim 9 wherein the authenticated communications path identifier includes a Virtual Local Area Network ("VLAN") tag.

11. The method of claim 9 wherein the authenticated communications path identifier includes a Layer-3 tunnel tag.

12. The method of claim 8 including the further step of creating the mapping by snooping authentication-related communication between the mobile client and a RADIUS server.

13. The method of claim 8 including the further step of creating the mapping by snooping authentication-related communication between the mobile client and a switch in the same subnet as the access point.

14. The method of claim 8 including the further step of obtaining the mapping directly from a switch in the same subnet as the access point.

* * * * *